US008266331B2

(12) United States Patent
Freking et al.

(10) Patent No.: US 8,266,331 B2
(45) Date of Patent: Sep. 11, 2012

(54) TRANSMITTING RETRY REQUEST ASSOCIATED WITH NON-POSTED COMMAND VIA RESPONSE CREDIT CHANNEL

(75) Inventors: Ronald E. Freking, Rochester, MN (US); Elizabeth A. McGlone, Rochester, MN (US); John L. Pike, Essex Junction, VT (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/834,313

(22) Filed: Jul. 12, 2010

(65) Prior Publication Data

US 2012/0011283 A1     Jan. 12, 2012

(51) Int. Cl.
*G06F 3/00*         (2006.01)
*H04L 12/50*        (2006.01)
(52) U.S. Cl. .......................................... 710/5; 370/381
(58) Field of Classification Search .............. 710/5, 305; 370/381
See application file for complete search history.

(56) References Cited

U.S. PATENT DOCUMENTS

| 2002/0040414 A1* | 4/2002 | Uehara et al. ................. 710/100 |
| 2004/0172493 A1* | 9/2004 | Askar ........................... 710/305 |
| 2007/0053350 A1* | 3/2007 | Spink et al. .................... 370/381 |
| 2007/0208899 A1* | 9/2007 | Freking et al. ................ 710/313 |
| 2009/0157972 A1* | 6/2009 | Byers et al. .................... 711/133 |

* cited by examiner

*Primary Examiner* — Hyun Nam
(74) *Attorney, Agent, or Firm* — Toler Law Group

(57) ABSTRACT

In a particular embodiment, a method is disclosed that includes, at a first computing device coupled to a second computing device via a bus, receiving a request from the second computing device to complete a non-posted command, where the request is received via a request credit channel of the bus, and where the first computing device is configured to receive requests to complete non-posted commands and requests to complete posted commands via the request credit channel. The method also includes removing the request to complete the non-posted command from the request credit channel. The method further includes transmitting a retry request associated with the non-posted command to the second computing device via a response credit channel of the bus.

20 Claims, 7 Drawing Sheets

TRANSMITTING RETRY REQUEST ASSOCIATED WITH NON-POSTED COMMAND VIA RESPONSE CREDIT CHANNEL

I. FIELD OF THE DISCLOSURE

The present disclosure is generally related to transmitting a retry request associated with a non-posted command via a response credit channel.

II. BACKGROUND

In an ordered stream of transactions, posted transactions (i.e., transactions that do not require a response, such as memory writes or messages) should be able to flow from one computing device to another computing device coupled together via a bus. If posted transactions become stalled and are not able to flow from one computing device to another computing device in an orderly fashion, the system may deadlock, causing system failure. In a system where posted transactions and non-posted transactions (i.e., transactions that do require a response, such as reads and configuration writes) are transmitted on the same request credit channel (i.e., a virtual channel between respective computing devices through which transactions such as requests to complete a command are transmitted from one computing device to another computing device), the non-posted transactions may stall the posted transactions if there are not enough non-posted transaction credits in a receiving queue at the receiving computer device. A typical solution may utilize separate queues and allow credits to fill separate queues, splitting the credit channels. The typical solution may not be viable when there is only one request credit channel.

III. SUMMARY

A request to complete a non-posted command may be sent from a source computing device to a destination computing device via a request credit channel of a bus coupling the source computing device to the destination computing device. When the non-posted command cannot be completed by being accepted by the destination computing device, the request to complete the non-posted command may be removed from the request credit channel A retry request associated with the non-posted command may be sent back to the source computing device on a response credit channel (or virtual channel) of the bus. The retry request may queue in a retry queue until the source computing device reissues the request to complete the non-posted command on the same request credit channel of the bus on which the request to complete the non-posted command was sent originally. If the request credit channel is full or has no credits, the retry queue may fill up with retry requests for the non-posted commands that have been previously sent and need to be retried. The cycle of retries may continue until the necessary ordering has completed and the retried non-posted command is accepted by the destination computing device.

In a particular embodiment, a method includes, at a first computing device coupled to a second computing device via a bus, receiving a request from the second computing device to complete a non-posted command. The request is received via a request credit channel of the bus, and the first computing device is configured to receive requests to complete non-posted commands and requests to complete posted commands via the request credit channel. The method also includes removing the request to complete the non-posted command from the request credit channel. The method further includes transmitting a retry request associated with the non-posted command to the second computing device via a response credit channel of the bus.

In another particular embodiment, a computing device includes an interface configured to receive requests to complete non-posted commands and requests to complete posted commands via a request credit channel and to transmit requests to retry non-posted commands via a response credit channel. The computing device also includes a controller configured to remove a request to complete a particular non-posted command from the request credit channel and to initiate transmission of a retry request associated with the particular non-posted command via the response credit channel.

In another particular embodiment, a program product is disclosed that includes program code resident within a memory and configured to be executed by a processor to transmit a first request to complete a non-posted command to a destination device via a request credit channel of a bus. The bus is configured to transmit requests to complete non-posted commands and requests to complete posted commands to a destination device. The program code is also configured to receive a retry request associated with the non-posted command from the destination device via a response credit channel of the bus. The program code is further configured to transmit a second request to complete the non-posted command to the destination device via the request credit channel of the bus.

One particular advantage provided by at least one of the disclosed embodiments is allowing posted transactions and non-posted transactions to be transmitted on the same request credit channel without having any of the non-posted transactions stalling any of the posted transactions and causing deadlock and system failure. This may be accomplished by allowing a non-posted transaction that is not able to be completed to be removed from the request credit channel and returned via a response credit channel to the source computing device that transmitted the non-posted transaction initially so that the non-posted transaction may be retried by being reissued by the source computing device. The disclosed embodiments are viable even if there is only one request credit channel. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

A request to complete a non-posted command may be sent from a source computing device to a destination computing device via a request credit channel of a bus coupling the source computing device to the destination computing device. The request credit channel may be a virtual channel of the bus coupling the source computing device to the destination computing device through which requests to complete commands may be sent from the source computing device to the destination computing device. When the non-posted command cannot be completed by being accepted by the destination computing device, the request to complete the non-posted command may be removed from the request credit channel. Removing the request to complete the non-posted command from the request credit channel may prevent the request to complete the non-posted command from stalling a subsequent request to complete a posted command. A retry request associated with the non-posted command may be sent back to the source computing device on a response credit channel of the bus. The response credit channel may be a virtual channel of the bus coupling the destination computing device to the source computing device through which completions and retry requests associated with commands may be sent from the destination computing device to the source computing device. The retry request may queue in a retry queue until the source computing device reissues the request to complete the non-posted command on the same request credit channel of the bus on which the request to complete the non-posted command was sent originally. If the request credit channel is full or has no credits, the retry queue may fill up with retry requests for the non-posted commands that have been previously sent and need to be retried. The cycle of retries may continue until the necessary ordering has completed and the retried non-posted command is accepted by the destination computing device.

Figure 1:
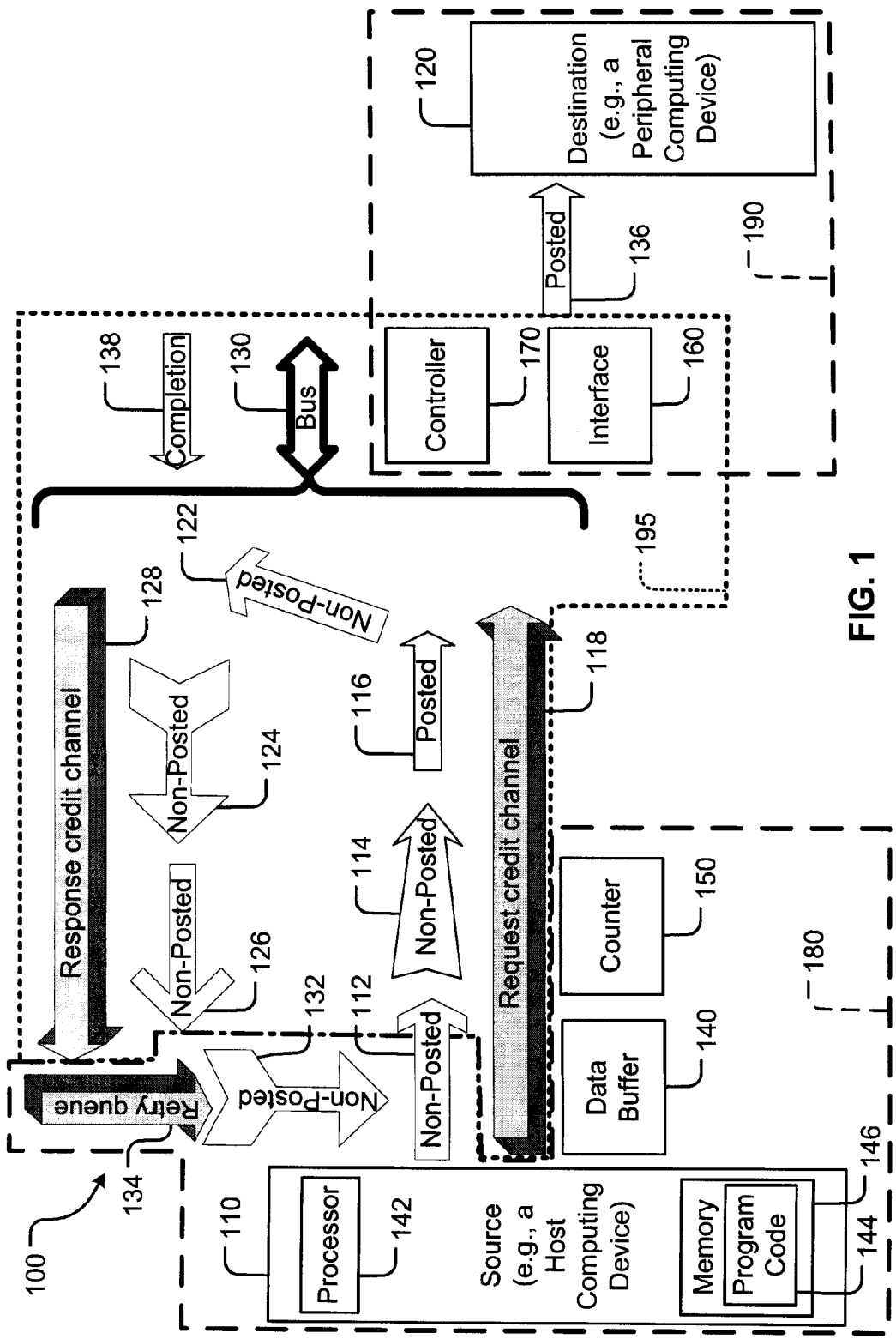
FIG. 1 is a block diagram of a first illustrative embodiment of a system to transmit a retry request associated with a non-posted command via a response credit channel.

Particular embodiments of the present disclosure are described with reference to the drawings. In the description, common features are designated by common reference numbers. Referring to FIG. 1, a block diagram of a first illustrative embodiment of a system to transmit a retry request associated with a non-posted command via a response credit channel is depicted and generally designated 100. The retry request system 100 may include a source 110, such as a host computing device, coupled to a destination 120, such as a peripheral computing device, via a bus 130. In a particular embodiment, the bus 130 is a peripheral component interconnect (PCI) express (PCIe) bus.

The bus 130 may include a request credit channel 118 that transmits requests from the source 110 to the destination 120. For example, the request credit channel 118 may be a virtual channel The requests may include a request to complete a non-posted command 112 (i.e., a transaction that requires a response, such as a read or a configuration write), another request to complete a non-posted command 114, and a request to complete a posted command 116 (i.e., a transaction that does not require a response, such as a memory write or a message). In a particular embodiment, the non-posted command is a memory read command, a memory read lock command, an input/output (I/O) read command, an I/O write command, a configuration read command, or a configuration write command. In a particular embodiment, the posted command is a memory write command or a messaging command.

In a particular embodiment, the request to complete the non-posted command 112 is data-free, where the non-posted command does not include data. In a particular embodiment, the request to complete the non-posted command 114 is data-included, where the non-posted command includes data.

The bus 130 may also include a response credit channel 128 that transmits retry requests from the destination 120 to the source 110. For example, the response credit channel 128 may be a virtual channel. The retry requests may include a retry request associated with a non-posted command 124 and another retry request associated with a non-posted command 126. In a particular embodiment, the retry request associated with the non-posted command 124 is data-included, where the non-posted command includes data. In a particular embodiment, the retry request associated with the non-posted command 126 is data-free, where the non-posted command does not include data.

The retry request system 100 may include a retry queue 134 where retry requests may be stored. For example, a retry request associated with a data-included non-posted command 132, where the non-posted command includes data, may be stored in the retry queue 134. Non-posted commands associated with respective retry requests may also be stored in the retry queue 134. In a particular embodiment, the data of the non-posted commands stored in the retry queue 134 may be stored in a data buffer 140. The retry queue 134 may be able to store retry requests associated with data-free non-posted commands, such as the data-free non-posted command 126, as well as retry requests associated with data-included non-posted commands, such as the data-included non-posted commands 132, 124. In a particular embodiment, the retry queue 134 and the data buffer 140 may be included in the source 110, as shown in phantom at 180.

In a particular embodiment, the retry queue 134 is able to store X retry requests associated with data-free non-posted commands, where X is any integer greater than or equal to zero. In addition, in a particular embodiment, the retry queue 134 is able to store Y retry requests associated with data-included non-posted commands, where Y is also any integer greater than or equal to zero. In a particular embodiment, the retry queue 134 includes a retry queue for storing retry requests associated with data-free non-posted commands and a retry queue for storing retry requests associated with data-included non-posted commands. For example, the retry queue for storing retry requests associated with data-free non-posted commands may be able to store up to X retry requests associated with data-free non-posted commands. Similarly, the retry queue for storing retry requests associated with data-included non-posted commands may be able to store up to Y retry requests associated with data-included non-posted commands.

In a particular embodiment, the retry queue for storing retry requests associated with data-included non-posted commands is smaller than the retry queue for storing retry requests associated with data-free non-posted commands because each entry in the retry queue for storing retry requests associated with data-included non-posted commands has enough room to accommodate the data included with the retry requests associated with data-included non-posted commands. In a particular embodiment, the retry queue for storing retry requests associated with data-free non-posted commands is larger than the retry queue for storing retry requests associated with data-included non-posted commands because there is no data included with the retry requests associated with data-free non-posted commands.

The source 110 may include a processor 142 and program code 144 resident within a memory 146. The program code 144 may be configured to be executed by the processor 142 to transmit a first request to complete a non-posted command to the destination 120 via the request credit channel 118 of the bus 130. The bus 130 may be configured to transmit requests, such as the requests to complete the non-posted commands 112, 114, and the request to complete the posted command 116, to the destination 120. The program code 144 may also be configured to receive retry requests, such as the retry requests associated with the non-posted commands 124, 126, from the destination 120 via the response credit channel 128 of the bus 130. The program code 144 may further be configured to transmit a second request to complete the non-posted command, such as the request to complete the non-posted command 132, to the destination 120 via the request credit channel 118 of the bus 130.

In a particular embodiment, the destination 120 may have an interface 160 and a controller 170, as shown in phantom at 190. The interface 160 may be configured to receive requests, such as the requests to complete the non-posted commands 112, 114, and the request to complete the posted command 116, via the request credit channel 118. The interface may be further configured to transmit retry requests, such as the requests to retry the non-posted commands 124, 126, via the response credit channel 128. The controller 170 may be configured to remove a request to complete a particular non-posted command, such as a non-posted command 122, from the request credit channel 118. The controller 170 may also be configured to initiate transmission of a retry request associated with the particular non-posted command, such as the non-posted command 122, via the response credit channel 128.

In operation, the source 110 transmits the request to complete the data-free non-posted command 112, the request to complete the data-included non-posted command 114, and the request to complete the posted command 116 to the destination 120 via the request credit channel 118 of the bus 130. A counter 150 associated with the request credit channel 118 may count a number of each type of request transmitted by the source 110. For example, when the request to complete the posted command 116 enters an ordered stream in the request credit channel 118 for the first time, the counter 150 may increment a number of requests to complete posted commands by one unit. Similarly, when the request to complete the data-included non-posted command 114 enters the ordered stream in the request credit channel 118 for the first time, the counter 150 may increment a number of requests to complete data-included non-posted commands by one unit. Likewise, when the request to complete the data-free non-posted command 112 enters the ordered stream in the request credit channel 118 for the first time, the counter 150 may increment a number of requests to complete data-free non-posted commands by one unit. In a particular embodiment, the counter 150 may be included in the source 110, as shown in phantom at 180.

When the number of requests to complete data-free non-posted commands exceeds a threshold corresponding to a number of queued data-free non-posted commands in the retry queue 134, no more requests to complete data-free non-posted commands are accepted into the ordered stream in the request credit channel 118 until the number of requests to complete data-free non-posted commands is decremented. The threshold corresponding to the number of queued data-free non-posted commands in the retry queue 134 may be a data-free non-posted command threshold. In a particular embodiment, the data-free non-posted command threshold is related to the number of retry requests associated with data-free non-posted commands. For example, as described above, the number of retry requests associated with data-free non-posted commands may be X, where X is any integer greater than or equal to zero, where X retry requests associated with data-free non-posted commands are able to be stored in the retry queue 134. For example, the data-free non-posted command threshold may be equal to X. The number of requests to complete data-free non-posted commands may be decremented upon completion of a request to complete a data-free non-posted command, when the request to complete the data-free non-posted command is received and accepted by the destination 120. Correspondingly, the number of queued data-free non-posted commands in the retry queue 134 may also be decremented if the request to complete the data-free non-posted command had been stored in the retry queue 134 as a retry request associated with the data-free non-posted command.

Similarly, when the number of requests to complete data-included non-posted commands exceeds a threshold corresponding to a number of queued data-included non-posted commands in the retry queue 134, no more requests to complete data-included non-posted commands are accepted into the ordered stream in the request credit channel 118 until the number of requests to complete data-included non-posted commands is decremented. The threshold corresponding to the number of queued data-included non-posted commands in the retry queue 134 may be a data-included non-posted command threshold. In a particular embodiment, the data-included non-posted command threshold is related to the number of retry requests associated with data-included non-posted commands. For example, as described above, the number of retry requests associated with data-included non-posted commands may be Y, where Y is any integer greater than or equal to zero, where Y retry requests associated with data-included non-posted commands are able to be stored in the retry queue 134. For example, the data-included non-posted command threshold may be equal to Y. The number of requests to complete data-included non-posted commands may be decremented, when the request to complete the data-included non-posted command is received and accepted by the destination 120. Correspondingly, the number of queued data-included non-posted commands in the retry queue 134 may also be decremented if the request to complete the data-included non-posted command had been stored in the retry queue 134 as a retry request associated with the data-included non-posted command.

In a particular embodiment, the bus 130 has the interface 160 and the controller 170, as shown in phantom at 195. The interface 160 and the controller 170 may receive a request, such as a request to complete a posted command 136, and transmit the request, such as the request to complete the posted command 136, to the destination 120. When the request to complete the posted command 136 reaches the destination 120, a completion 138 may be transmitted to the source 110 via the response credit channel 128. When the source 110 receives the completion 138, the counter 150 may decrement the number of requests to complete posted commands by one unit.

The interface 160 and the controller 170 may also receive a request, such as the request to complete the data-free non-posted command 122, and determine that the request to complete the data-free non-posted command 122 cannot be completed. If the request to complete the data-free non-posted command 122 cannot be removed from the request credit channel 118 and placed on a non-posted credit channel (not shown), the controller 170 may remove the request to complete the data-free non-posted command 122 from the request credit channel 118 and initiate transmission of a retry request associated with the data-free non-posted command 122 via the response credit channel 128. The interface 160 may transmit the retry request associated with the data-free non-posted command 122 to the retry queue 134 via the response credit channel 128.

The retry request associated with the data-free non-posted command 122 enters the response credit channel 128 following the retry request associated with the data-free non-posted command 126 and the retry request associated with the data-included non-posted command 124. When the retry request associated with the data-free non-posted command 122 is stored in the retry queue 134, there may be another retry request associated with a data-free non-posted command stored in the retry queue for storing retry requests associated with data-free non-posted commands, such as the retry request associated with the data-free non-posted command 126. However, the source 110 may have already transmitted another request to complete the data-free non-posted command 126 to the destination 120 via the request credit channel 118. Similarly, when the retry request associated with the data-free non-posted command 122 is stored in the retry queue 134, there may be other retry requests associated with data-included non-posted commands stored in the retry queue for storing retry requests associated with data-included non-posted commands, such as the retry request associated with the data-included non-posted command 132 and the retry request associated with the data-included non-posted command 124. However, the source 110 may have already transmitted another request to complete the data-included non-posted command 132 and another request to complete the data-included non-posted command 124 to the destination 120 via the request credit channel 118.

When the source 110 transmits another request to complete the data-free non-posted command 126 to the destination 120 via the request credit channel 118, the counter 150 may not increment the number of requests to complete data-free non-posted commands. Similarly, when the source 110 transmits another request to complete the data-included non-posted command 132 or another request to complete the data-included non-posted command 124 to the destination 120 via the request credit channel 118, the counter 150 may not increment the number of requests to complete data-included non-posted commands. The cycle of retries may continue until each of the requests to complete the non-posted commands 132, 126, 124, 122 is accepted by the destination 120.

The system 100 may permit posted transactions, such as the requests to complete posted commands 136, 116, and non-posted transactions, such as the requests to complete non-posted commands 114, 112, to be transmitted on the same request credit channel 118 without having non-posted transactions stalling posted transactions. The system 100 may thus avoid deadlock or system failure. The system 100 may be viable even when there is only one request credit channel, such as the request credit channel 118.

Figure 2:
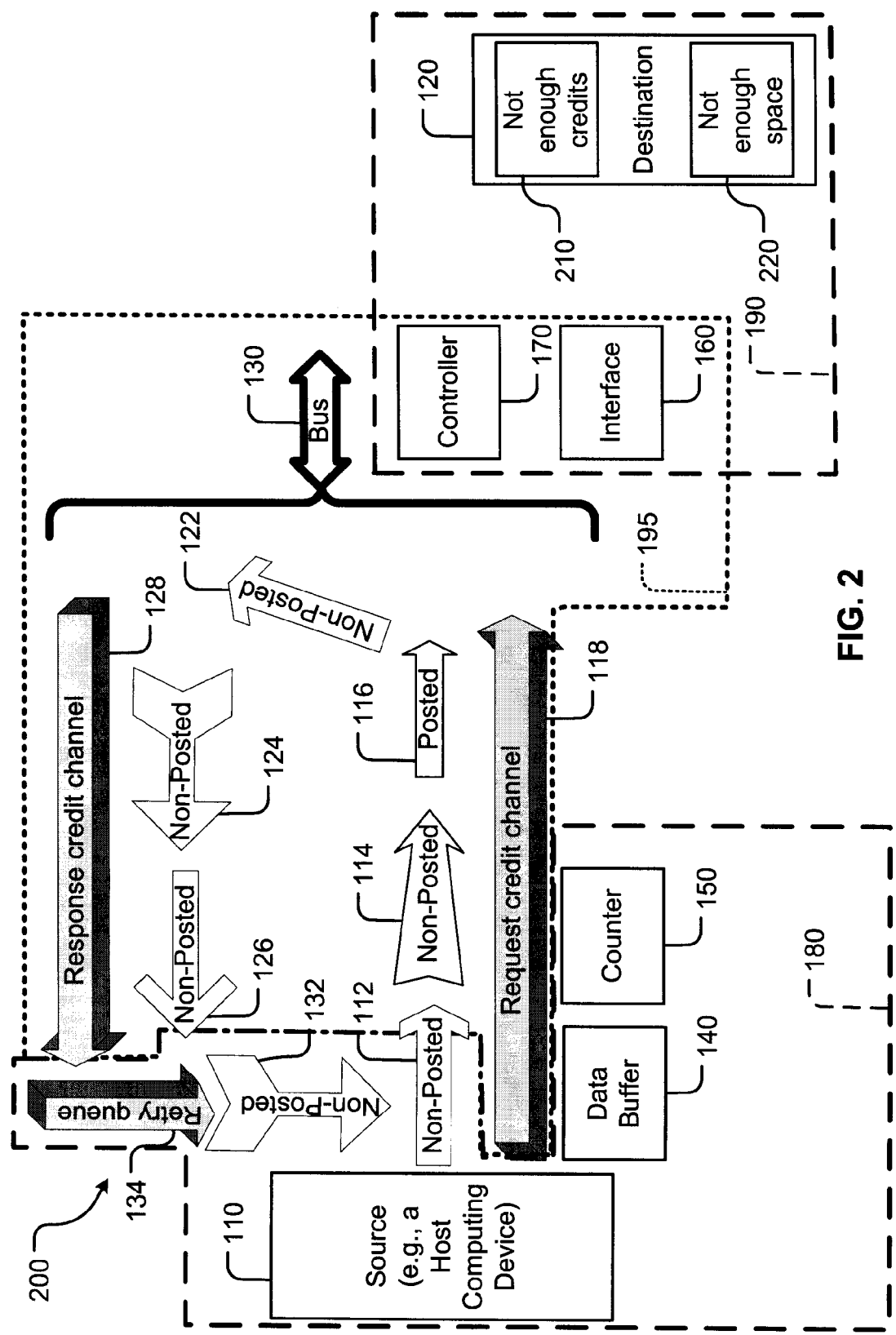
FIG. 2 is a block diagram of the first illustrative embodiment of the system to transmit the retry request associated with the non-posted command via the response credit channel, showing conditions under which the non-posted command is not able to be completed by a destination computing device.

Referring to FIG. 2, a block diagram of the first illustrative embodiment of the system 100, showing conditions under which the request to complete the non-posted command 122 is not able to be completed by the destination 120, is depicted and generally designated 200. For example, if there are not enough credits 210 at the destination 120 then the request to complete the data-free non-posted command 122 cannot be completed. Similarly, if there is not enough space 220 at the destination 120 then the request to complete the data-free non-posted command 122 cannot be completed.

The interface 160 and the controller 170 may determine that the request to complete the data-free non-posted command 122 cannot be completed. As described above with reference to FIG. 1, if the request to complete the data-free non-posted command 122 cannot be removed from the request credit channel 118 and placed on a non-posted credit channel (not shown), the controller 170 may remove the request to complete the data-free non-posted command 122 from the request credit channel 118 and initiate transmission of the retry request associated with the data-free non-posted command 122 via the response credit channel 128. The interface 160 may transmit the retry request associated with the data-free non-posted command 122 to the retry queue 134 via the response credit channel 128.

In a particular embodiment, upon receiving a request to complete a non-posted command, such as the request to complete the data-free non-posted command 122, a determination may be made that the non-posted command cannot be completed. For example, as described above, if there are not enough credits 210 at the destination 120, the request to complete the data-free non-posted command 122 cannot be completed. Similarly, as described above, if there is not enough space 220 at the destination 120, the request to complete the data-free non-posted command 122 cannot be completed.

In a particular embodiment, determining that a request to complete a non-posted command cannot be completed includes determining that a number of queued non-posted commands exceeds a threshold. For example, determining that the request to complete the data-free non-posted command 122 cannot be completed may include determining that the number of queued data-free non-posted commands exceeds the data-free non-posted command threshold. Similarly, determining that the request to complete the data-included non-posted command 114 cannot be completed may include determining that the number of queued data-included non-posted commands exceeds the data-included non-posted command threshold.

In a particular embodiment, a queued non-posted command is completed and the number of queued non-posted commands is decremented. For example, a queued data-free non-posted command may be completed and the corresponding number of queued data-free non-posted commands may be decremented by the counter 150 by one unit. Similarly, a queued data-included non-posted command may be completed and the corresponding number of queued data-included non-posted commands may be decremented by the counter 150 by one unit. FIG. 2 shows conditions under which the request to complete the non-posted command 122 is not able to be completed by the destination 120, such as when there are not enough credits 210 at the destination 120 or when there is not enough space 220 at the destination 120.

Figure 3:
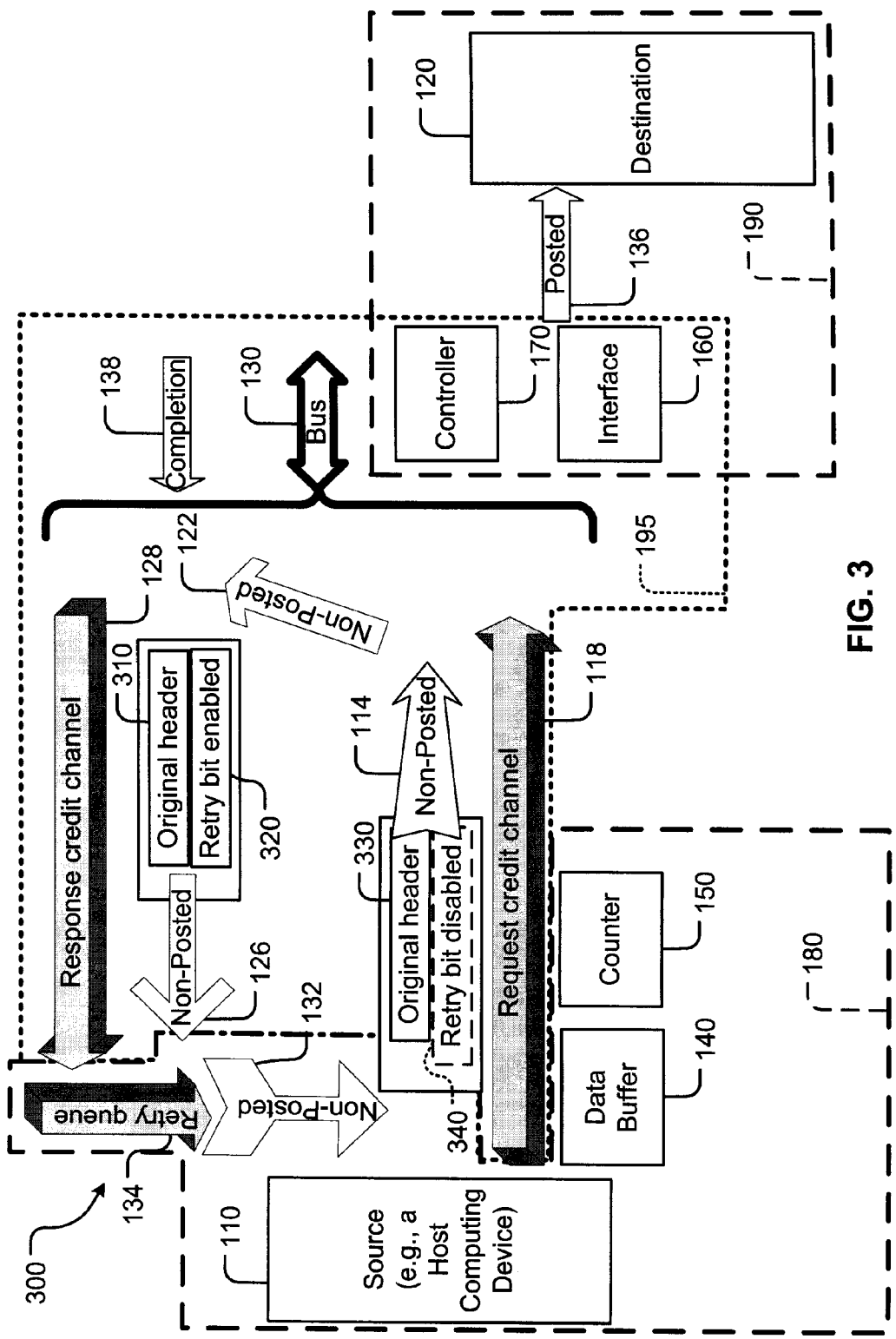
FIG. 3 is a block diagram of a second illustrative embodiment of a system to transmit a retry request associated with a non-posted command via a response credit channel, showing a retry request associated with the non-posted command including a retry bit in an enabled state and another request to complete the non-posted command including a retry bit in a disabled state.

Referring to FIG. 3, a block diagram of a second illustrative embodiment of a system transmitting a retry request associated with a non-posted command via a response credit channel, showing a retry request associated with the non-posted command including a retry bit in an enabled state and a request to complete another non-posted command including a retry bit in a disabled state, is depicted and generally designated 300. A retry request associated with a non-posted command, such as the retry request associated with the data-free non-posted command 126, may be transmitted on the response credit channel 128 with an original header 310. The original header 310 may be the original header that was originally transmitted on the request credit channel 118 with the request to complete the data-free non-posted command 126. The retry request associated with the non-posted command, such as the retry request associated with the data-free non-posted command 126, may also include a retry bit in an enabled state 320. The retry bit may be enabled by being flipped, for example. Having the retry bit in the enabled state 320 may enable the source 110 to recognize the retry request associated with the data-free non-posted command 126, on the response credit channel 128, as a retry request rather than as some other response.

When the source 110 transmits another request to complete a non-posted command, such as the request to complete the data-included non-posted command 114, to the destination 120 via the request credit channel 118, an original header 330 may be used. Data of the non-posted command, to be included in the request to complete the data-included non-posted command 114, may be added into the original header 330. For example, data of the non-posted command stored in the data buffer 140 may be introduced into the original header 330. The request to complete the non-posted command, such as the request to complete the data-included non-posted command 114, may also include a retry bit in a disabled state 340 (shown in phantom). The retry bit may be disabled by being unflipped or by being removed, for example. When the source 110 transmits yet another request to complete a non-posted command to the destination 120 via the request credit channel 118, such as the request to complete the data-free non-posted command 126, the original header 310 may be used. The retry bit in the enabled state 320 may be placed in a disabled state like the disabled state of the retry bit in the disabled state 340. FIG. 3 shows the retry request associated with the data-free non-posted command 126 transmitted on the response credit channel 128 with the original header 310 and the retry bit enabled 320. FIG. 3 also shows another request associated with the data-included non-posted command 114 transmitted on the request credit channel 118 with the original header 330 and the retry bit disabled 340.

Figure 4:
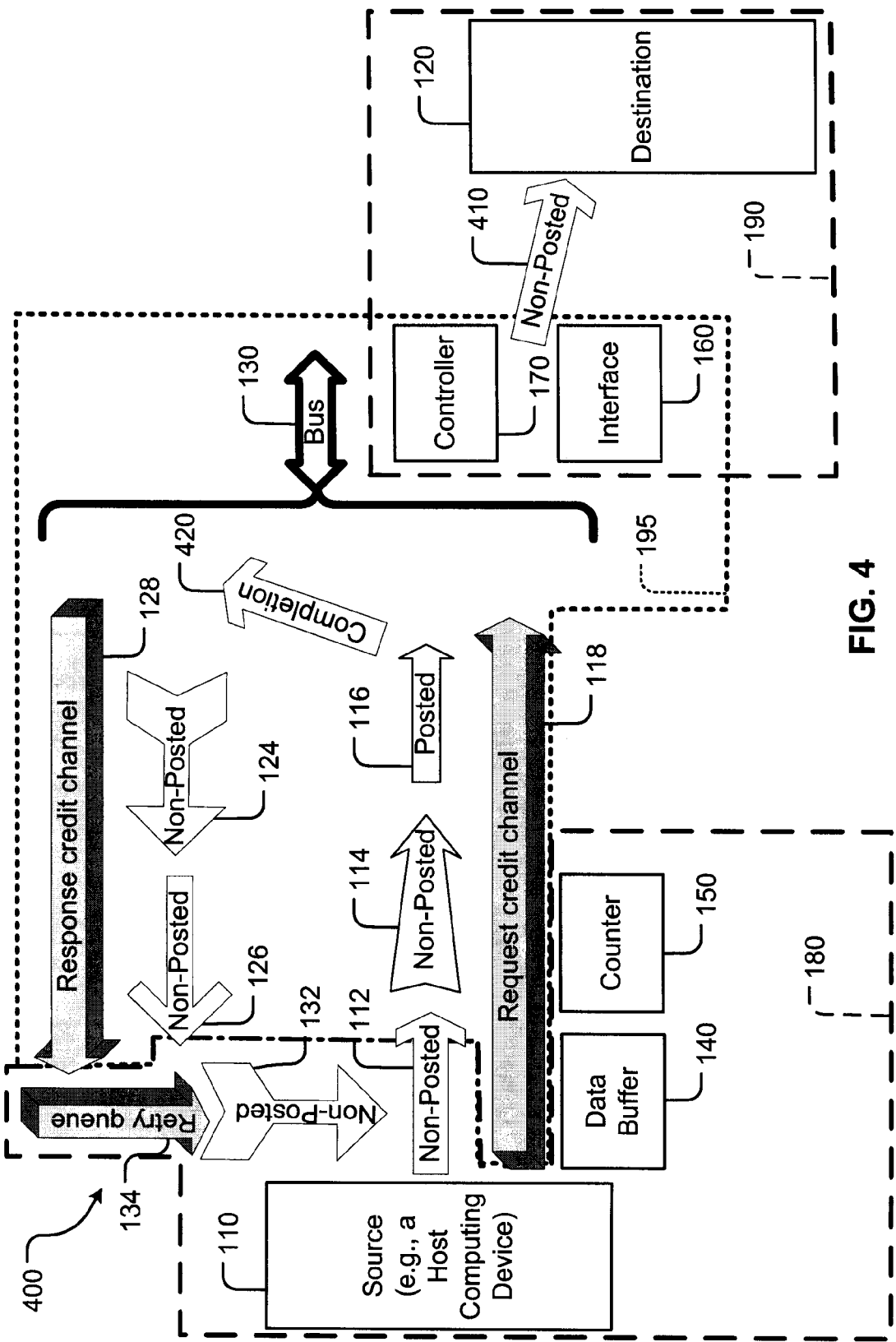
FIG. 4 is a block diagram of a third illustrative embodiment of a system to transmit a retry request associated with a non-posted command via a response credit channel, showing completion of a request to complete a data-free non-posted command that does not include data.

Referring to FIG. 4, a block diagram of a third illustrative embodiment of a system transmitting a retry request associated with a non-posted command via a response credit channel, showing completion of a request to complete a data-free non-posted command that does not include data, is depicted and generally designated 400. When a request to complete a data-free non-posted command, such as a request to complete a data-free non-posted command 410, reaches the destination 120, a completion 420 may be transmitted to the source 110 via the response credit channel 128. When the source 110 receives the completion 420, the counter 150 may decrement the number of requests to complete data-free non-posted commands by one unit. When the source 110 receives the completion 420, the counter 150 may also decrement the number of queued data-free non-posted commands in the retry queue 134 by one unit if the request to complete the data-free non-posted command 410 had been stored in the retry queue 134 as a retry request associated with the data-free non-posted command. This is particularly the case if the data-free non-posted command had also been queued in the retry queue 134 along with the retry request associated with the data-free non-posted command.

Figure 5:
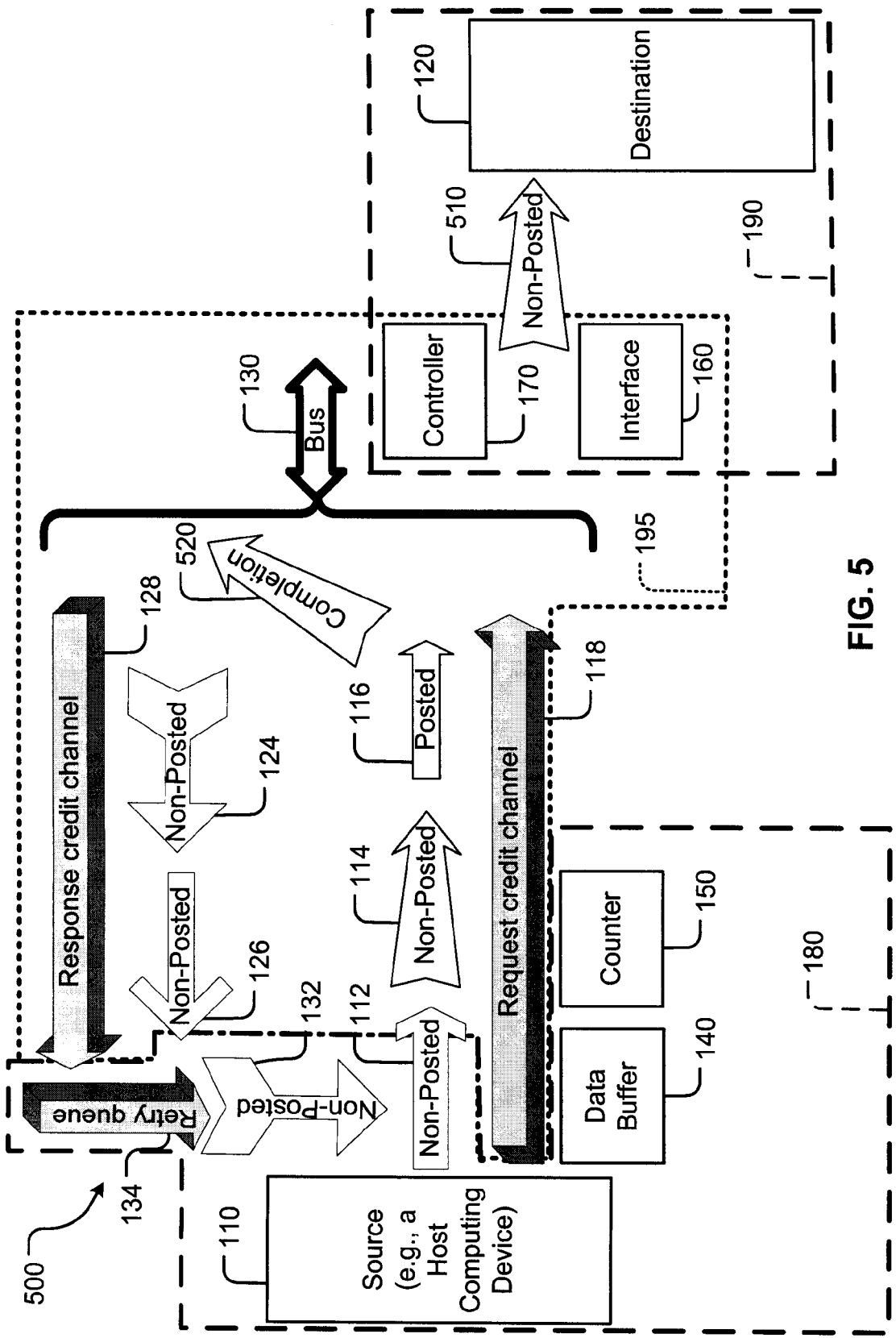
FIG. 5 is a block diagram of a fourth illustrative embodiment of a system to transmit a retry request associated with a non-posted command via a response credit channel, showing completion of a request to complete a data-included non-posted command that includes data.

Referring to FIG. 5, a block diagram of a fourth illustrative embodiment of a system transmitting a retry request associated with a non-posted command via a response credit channel, showing completion of a request to complete a data-included non-posted command that includes data, is depicted and generally designated 500. When a request to complete a data-included non-posted command, such as a request to complete a data-included non-posted command 510, reaches the destination 120, a completion 520 may be transmitted to the source 110 via the response credit channel 128. When the source 110 receives the completion 520, the counter 150 may decrement the number of requests to complete data-included non-posted commands by one unit. When the source 110 receives the completion 520, the counter 150 may also decrement the number of queued data-included non-posted commands in the retry queue 134 by one unit if the request to complete the data-included non-posted command 510 had been stored in the retry queue 134 as a retry request associated with the data-included non-posted command. This is particularly the case if the data-included non-posted command had also been queued in the retry queue 134 along with retry request associated with the data-included non-posted command.

Figure 6:
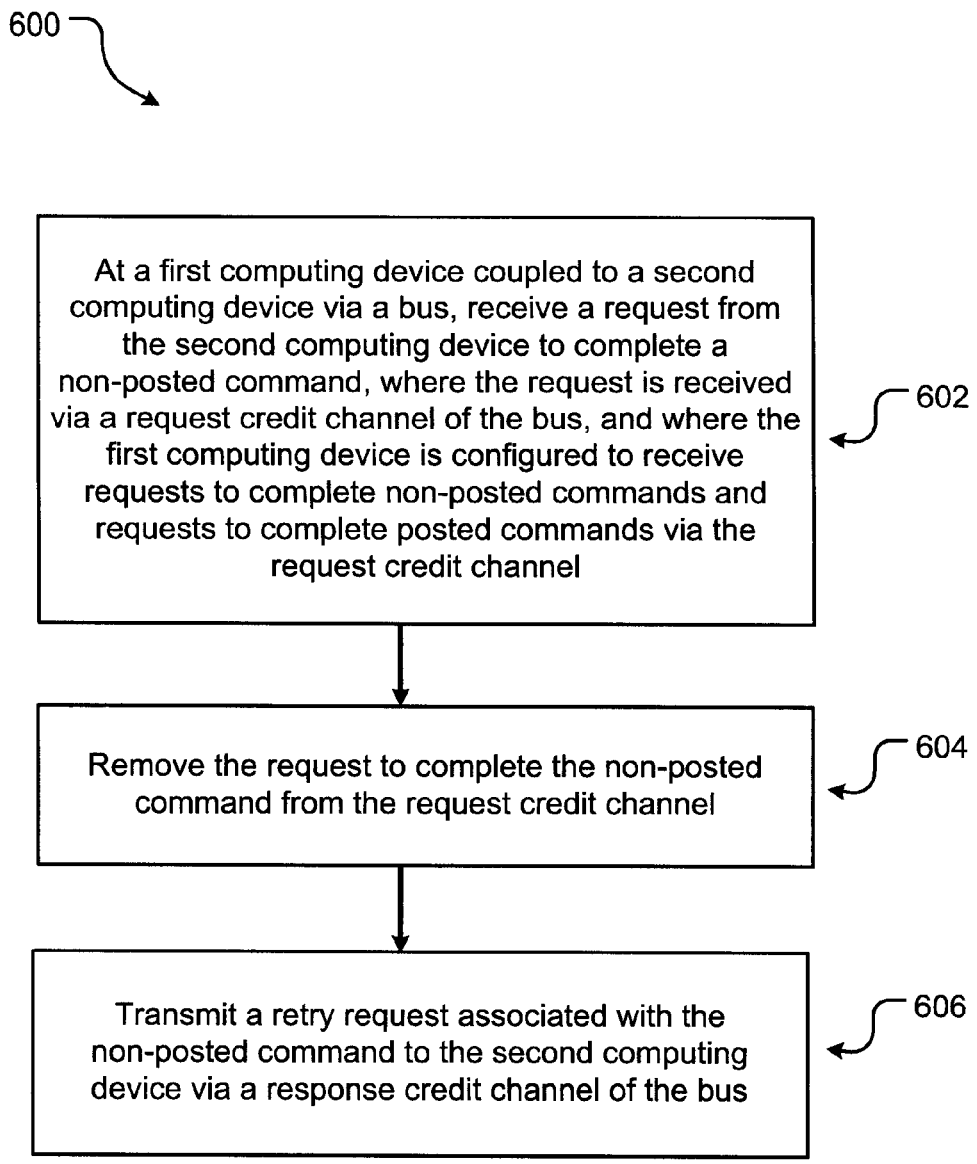
FIG. 6 is a flow diagram of a first illustrative embodiment of a method of transmitting a retry request associated with a non-posted command via a response credit channel.

Referring to FIG. 6, a flow diagram of a first illustrative embodiment of a method of transmitting a retry request associated with a non-posted command via a response credit channel is depicted and generally designated 600. The method 600 includes, at a first computing device coupled to a second computing device via a bus, receiving a request from the second computing device to complete a non-posted command. The request is received via a request credit channel of the bus, and the first computing device is configured to receive requests to complete non-posted commands and requests to complete posted commands via the request credit channel, at 602. For example, as shown in FIG. 1, the destination 120, which may be a peripheral computing device, may be coupled to the source 110, which may be a host computing device, via the bus 130. The destination 120 may receive a request from the source 110 to complete a non-posted command, such as the request to complete the data-free non-posted command 112 or the request to complete the data-included non-posted command 114. The request to complete the data-free non-posted command 112 and the request to complete the data-included non-posted command 114 may be received via the request credit channel 118 of the bus 130. The destination 120 may be configured to receive requests to complete non-posted commands via the request credit channel 118 of the bus 130, such as the request to complete the data-free non-posted command 112 and the request to complete the data-included non-posted command 114. The destination 120 may also be configured to receive requests to complete posted commands via the request credit channel 118 of the bus 130, such as the request to complete the posted command 116.

The method 600 also includes removing the request to complete the non-posted command from the request credit channel, at 604. For example, as shown in FIG. 2, the controller 170 of the destination 120 may be configured to remove the request to complete a particular non-posted command, such as the request to complete the data-free non-posted command 122, from the request credit channel 118. The method 600 further includes transmitting a retry request associated with the non-posted command to the second computing device via a response credit channel of the bus, at 606. For example, as shown in FIG. 3, the controller 170 of the destination 120 may be configured to initiate transmission of a retry request associated with the particular non-posted command, such as the retry request associated with the data-free non-posted command 126, to the source 110 via the response credit channel 128 of the bus 130. The interface 160 of the destination 120 may be configured to transmit requests to retry non-posted commands, such as the retry request associated with the data-free non-posted command 126, via the response credit channel 128.

In a particular embodiment, the method 600 further includes receiving a request to complete a posted command via the request credit channel, after transmitting the retry request via the response credit channel. For example, as shown in FIG. 1, after transmitting the retry request associated with the data-free non-posted command 122 via the response credit channel 128, the interface 160 of the destination 120 may be configured to receive a request to complete a posted command, such as the request to complete the posted command 116, via the request credit channel 118.

In a particular embodiment, the method 600 further includes receiving a second request to complete the non-posted command via the request credit channel, after transmitting the retry request via the response credit channel For example, as shown in FIG. 1, after transmitting the retry request associated with the data-free non-posted command 122 via the response credit channel 128, the interface 160 of the destination 120 may be configured to receive a request to complete a non-posted command, such as the request to complete the data-included non-posted command 114, via the request credit channel 118.

In a particular embodiment, the method 600 further includes determining that the non-posted command cannot be completed, upon receiving the request to complete the non-posted command. For example, as shown in FIG. 2, upon receiving the request to complete the data-free non-posted command 122, a determination may be made by the controller 170 of the destination 120 that the request to complete the data-free non-posted command 122 cannot be completed. For example, if there are not enough credits 210 at the destination 120, the request to complete the data-free non-posted command 122 cannot be completed. Similarly, if there is not enough space 220 at the destination 120, the request to complete the data-free non-posted command 122 cannot be completed.

In a particular embodiment, determining that the non-posted command cannot be completed includes determining that a number of queued non-posted commands exceeds a threshold. For example, as shown in FIG. 2, determining that the request to complete the data-free non-posted command 122 cannot be completed may include determining that the number of queued data-free non-posted commands exceeds the data-free non-posted command threshold. Similarly, determining that the request to complete the data-included non-posted command 114 cannot be completed may include determining that the number of queued data-included non-posted commands exceeds the data-included non-posted command threshold.

In a particular embodiment, the method 600 further includes completing a queued non-posted command and decrementing the number of queued non-posted commands. For example, as shown in FIG. 4, a queued data-free non-posted command 410 may be completed and the corresponding number of queued data-free non-posted commands may be decremented by one unit if the queued data-free non-posted command 410 had been queued in the retry queue 134. Similarly, as shown in FIG. 5, a queued data-included non-posted command may be completed and the corresponding number of queued data-included non-posted commands may be decremented by one unit if the queued data-free non-posted command 510 had been queued in the retry queue 134.

In a particular embodiment, a non-posted command includes data, and the threshold is a data-included non-posted command threshold. For example, as shown in FIG. 1, the request to complete the data-included non-posted command 114 includes data, the retry request associated with the data-included non-posted command 124 includes data, and the retry request associated with the data-included non-posted command 132 includes data. The corresponding threshold is a data-included non-posted command threshold.

In a particular embodiment, the method 600 further includes storing the non-posted command and adding the data of the non-posted command into a header of the retry request. For example, as shown in FIG. 3, the retry request associated with the data-included non-posted command 132, and the corresponding data-included non-posted command, may be stored in the retry queue 134. The included data may be stored in the data buffer 140. When the source 110 retries a request to complete a non-posted command, by removing a retry request associated with the non-posted command from the retry queue 134, and transmits another request to complete the non-posted command, such as the request to complete the data-included non-posted command 114, to the destination 120 via the request credit channel 118, the original header 330 may be used. The data of the non-posted command, to be included in the request to complete the data-included non-posted command 114, may be added into the original header 330. For example, the data of the corresponding non-posted command stored in the data buffer 140 may be introduced into the original header 330.

In a particular embodiment, a non-posted command does not include data, and that the threshold is a data-free non-posted command threshold. For example, as shown in FIG. 1, the request to complete the data-free non-posted command 112 does not include data, the retry request associated with the data-free non-posted command 122 does not include data, and the retry request associated with the data-free non-posted command 126 does not include data. The corresponding threshold is a data-free non-posted command threshold. When the source 110 retries a request to complete a non-posted command, by removing a retry request associated with the non-posted command from the retry queue 134, and transmits another request to complete the non-posted command, such as the request to complete the data-free non-posted command 126, as shown in FIG. 3, to the destination 120 via the request credit channel 118, the original header 310 may be used.

In a particular embodiment, a retry request associated with a non-posted command includes a retry bit in an enabled state. For example, as shown in FIG. 3, the retry request associated with the data-free non-posted command 126 may include the retry bit in the enabled state 320. Having the retry bit in the enabled state 320, by being flipped, for example, may enable the source 110 to recognize the retry request associated with the data-free non-posted command 126 on the response credit channel 128 as a retry request rather than as some other response.

In a particular embodiment, a request to complete a non-posted command includes the retry bit in a disabled state. For example, as shown in FIG. 3, when the source 110 transmits another request to complete a non-posted command, such as the request to complete the data-included non-posted command 114, to the destination 120 via the request credit channel 118, the request to complete the non-posted command, such as the request to complete the data-included non-posted command 114, may include the retry bit in the disabled state 340 (shown in phantom). The retry bit in the disabled state 340 may be placed in a disabled state by being unflipped or by being removed, for example. When the source 110 transmits yet another request to complete a non-posted command to the destination 120 via the request credit channel 118, such as the request to complete the data-free non-posted command 126, the retry bit in the enabled state 320 may be placed in a disabled state.

Figure 7:
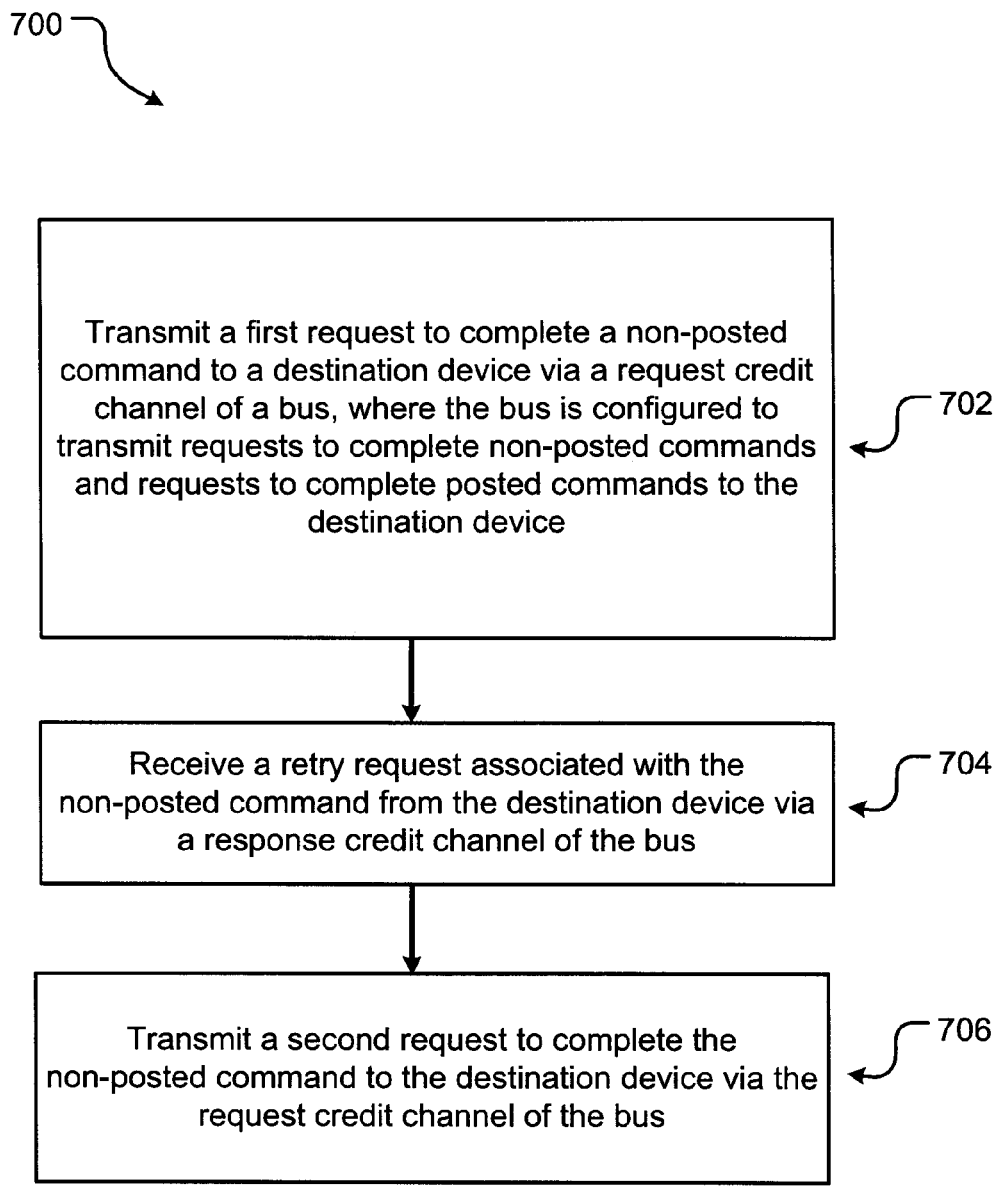
FIG. 7 is a flow diagram of a second illustrative embodiment of a method of transmitting a retry request associated with a non-posted command via a response credit channel.

Referring to FIG. 7, a flow diagram of a second illustrative embodiment of a method of transmitting a retry request associated with a non-posted command via a response credit channel is depicted and generally designated 700. The method 700 includes transmitting a first request to complete a non-posted command to a destination device via a request credit channel of a bus, where the bus is configured to transmit requests to complete non-posted commands and requests to complete posted commands to the destination device, at 702. For example, as shown in FIG. 1, the destination 120, which may be a peripheral computing device, may be coupled to the source 110, which may be a host computing device, via the bus 130, which may be a peripheral component interconnect (PCI) express (PCIe) bus. The source 110 may transmit a request to the destination 120 to complete a non-posted command, such as the request to complete the data-free non-posted command 112 or the request to complete the data-included non-posted command 114. The request to complete the data-free non-posted command 112 and the request to complete the data-included non-posted command 114 may be transmitted via the request credit channel 118 of the bus 130. The bus 130 may be configured to transmit requests to complete non-posted commands, such as the request to complete the data-free non-posted command 112 and the request to complete the data-included non-posted command 114, and requests to complete posted commands, such as the request to complete the posted command 116, via the request credit channel 118 of the bus 130.

The method 700 also includes receiving a retry request associated with the non-posted command from the destination device via a response credit channel of the bus, at 704. For example, as shown in FIG. 1, the source 110 may receive the retry request associated with the data-included non-posted command 132, the retry request associated with the data-free non-posted command 126, and the retry request associated with the data-included non-posted command 124 from the destination 120 via the response channel 128 of the bus 130. The method 700 further includes transmitting a second request to complete the non-posted command to the destination device via the request credit channel of the bus, at 706. For example, as shown in FIG. 3, the source 110 may transmit another request to complete the data-included non-posted command 114 to the destination 120 via the request credit channel 118 of the bus 130.

For example, as shown in FIG. 1, the source 110 may include the processor 142 and the program code 144 resident within the memory 146. The program code 144 may be configured to be executed by the processor 142 to transmit a first request to complete a non-posted command to the destination device 120 via the request credit channel 118 of the bus 130. The bus 130 may be configured to transmit requests, such as the requests to complete the non-posted commands 112, 114 and such as the request to complete the posted command 116, to the destination device 120. The program code 144 may also be configured to receive retry requests, such as the retry requests associated with the non-posted commands 124, 126, from the destination device 120 via the response credit channel 128 of the bus 130. The program code 144 may further be configured to transmit a second request to complete the non-posted command, such as the request to complete the non-posted command 132, to the destination device 120 via the request credit channel 118 of the bus 130.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc—read only memory (CD-ROM), compact disc—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. A method comprising:
    at a first computing device coupled to a second computing device via a bus, receiving a request from the second computing device to complete a non-posted command, wherein the request is received via a request credit channel of the bus, and wherein the first computing device is configured to receive requests to complete non-posted commands and requests to complete posted commands via the request credit channel, and wherein each non-posted command is a memory read command, a memory read lock command, an input/output (I/O) read command, an I/O write command, a configuration read command, or a configuration write command, and wherein each posted command is a memory write command or a messaging command;
    removing the request to complete the non-posted command from the request credit channel;
    transmitting a retry request prompting a reissue of the request to complete the non-posted command to the second computing device via a response credit channel of the bus, wherein the retry request includes a retry bit in an enabled state, and wherein the retry bit in the enabled state enables the second computing device to recognize the retry request; and
    after transmitting the retry request via the response credit channel, receiving a second request to complete the non-posted command via the request credit channel based on the retry bit in the retry request in the enabled state, wherein the request credit channel of the bus transmits requests to complete commands from the second computing device to the first computing device, and the response credit channel transmits retry requests prompting reissues of requests to complete commands from the first computing device to the second computing device.

2. The method of claim 1, further comprising, after transmitting the retry request via the response credit channel, receiving a request to complete a posted command via the request credit channel, wherein completing the posted command to be completed depends on removing the request to complete the non-posted command from the request credit channel.

3. The method of claim 1, further comprising, upon receiving the request to complete the non-posted command, determining that the non-posted command cannot be completed.

4. The method of claim 3, wherein determining that the non-posted command cannot be completed comprises determining that a number of queued non-posted commands queued in a retry queue exceeds a threshold.

5. The method of claim 4, further comprising:
completing a queued non-posted command; and
decrementing the number of queued non-posted commands.

6. The method of claim 4, wherein the non-posted command includes data and wherein the threshold is a data-included non-posted command threshold.

7. The method of claim 6, further comprising:
storing the non-posted command; and
adding the data of the non-posted command into a header of the retry request.

8. The method of claim 4, wherein the non-posted command does not include data and wherein the threshold is a data-free non-posted command threshold.

9. The method of claim 1, wherein the request to complete the non-posted command includes a retry bit in a disabled state.

10. The method of claim 1, wherein the bus is a peripheral component interconnect express (PCIe) bus.

11. The method of claim 1, wherein the first computing device is a peripheral computing device and wherein the second computing device is a host computing device.

12. A computing device comprising:
an interface configured to:
receive requests to complete non-posted commands and requests to complete posted commands via a request credit channel, wherein each non-posted command is a memory read command, a memory read lock command, an input/output (I/O) read command, an I/O write command, a configuration read command, or a configuration write command, and wherein each posted command is a memory write command or a messaging command; and
transmit requests to retry non-posted commands via a response credit channel; and
a controller configured to:
remove a request to complete a particular non-posted command from the request credit channel;
initiate transmission of a retry request prompting a reissue of the request to complete the particular non-posted command via the response credit channel, wherein the retry request includes a retry bit in an enabled state, and wherein the retry bit in the enabled state is used by a second computing device to identify the retry request; and
the interface further configured to after transmitting the retry request via the response credit channel, receive a second request to complete the particular non-posted command via the request credit channel based on the retry bit in the retry request in the enabled state, wherein the request credit channel transmits requests to complete commands from the second computing device to the computing device, and the response credit channel transmits retry requests prompting reissues of requests to complete commands from the computing device to the second computing device.

13. A non-transitory computer readable medium comprising a program product comprising program code resident within the non-transitory computer readable medium, wherein the program code is configured to be executed by a processor to:
transmit a first request to complete a non-posted command to a destination device via a request credit channel of a bus, wherein the bus is configured to transmit requests to complete non-posted commands and requests to complete posted commands to the destination device, and wherein each non-posted command is a memory read command, a memory read lock command, an input/output (I/O) read command, an I/O write command, a configuration read command, or a configuration write command, and wherein each posted command is a memory write command or a messaging command;
receive a retry request prompting a reissue of the request to complete the non-posted command from the destination device via a response credit channel of the bus, wherein the retry request includes a retry bit in an enabled state, and wherein the retry bit in the enabled state is used to identify the retry request; and
transmit a second request to complete the non-posted command to the destination device via the request credit channel of the bus based on the retry bit in the retry request in the enabled state, wherein the request credit channel of the bus transmits requests to complete commands to the destination device, and the response credit channel transmits retry requests prompting reissues of requests to complete commands from the destination device.

14. The program product of claim 13, wherein the bus is a peripheral component interconnect express (PCIe) bus.

15. The program product of claim 13, wherein the destination device is a peripheral computing device.

16. The computing device of claim 12, wherein the controller is further configured to determine that the non-posted command cannot be completed.

17. The computing device of claim 16, wherein the controller is further configured to determine that the non-posted command cannot be completed by determining that a number of queued non-posted commands queued in a retry queue exceeds a threshold.

18. The computing device of claim 12, wherein the request to complete the particular non-posted command includes a retry bit in a disabled state.

19. The computing device of claim 12, wherein the interface is configured to, after transmitting the retry request via the response credit channel, receive a request to complete a posted command via the request credit channel, wherein completing the posted command to be completed depends on removing the request to complete the non-posted command from the request credit channel.

20. The program product of claim 13, wherein the first request to complete the non-posted command includes a retry bit in a disabled state.

* * * * *